# United States Patent
Stecher et al.

(12)

(10) Patent No.: US 7,144,622 B1
(45) Date of Patent: Dec. 5, 2006

(54) COATING AND A SEAL CONSISTING OF SAID COATING

(75) Inventors: Friedhelm Stecher, Wilhelmshaven (DE); Christoph Stecher, Wilhelmshaven (DE)

(73) Assignee: STE Gesellschaft fur Dichtungstechnik mbH (DE)

( * ) Notice: Subject to any disclaimer, the term of this patent is extended or adjusted under 35 U.S.C. 154(b) by 0 days.

(21) Appl. No.: 10/069,766

(22) PCT Filed: Aug. 29, 2000

(86) PCT No.: PCT/EP00/08420

§ 371 (c)(1),
(2), (4) Date: May 29, 2002

(87) PCT Pub. No.: WO01/16240

PCT Pub. Date: Mar. 8, 2001

(30) Foreign Application Priority Data

Aug. 31, 1999 (DE) ................. 199 41 410

(51) Int. Cl.
*B32B 7/02* (2006.01)
*B32B 27/08* (2006.01)
*C08K 3/04* (2006.01)

(52) U.S. Cl. .............. 428/217; 428/212; 428/421; 524/493; 524/495

(58) Field of Classification Search ............ 428/36.21, 428/212, 66.4, 304.4, 315.5, 315.9, 316.6, 428/317.9, 319.3, 319.7, 323; 524/495, 494, 524/493, 423, 419, 420
See application file for complete search history.

(56) References Cited

U.S. PATENT DOCUMENTS

| 4,103,913 A | * | 8/1978 | McDowell .................. 277/592 |
| 4,434,989 A | * | 3/1984 | Beyer et al. ................ 277/592 |
| 5,230,961 A | * | 7/1993 | Tannenbaum ............... 428/422 |
| 5,708,089 A | * | 1/1998 | Scheckenbach et al. .... 525/189 |
| 5,846,645 A | * | 12/1998 | Yokota et al. .............. 428/327 |
| 6,077,609 A | * | 6/2000 | Blong et al. ................ 428/412 |

FOREIGN PATENT DOCUMENTS

| EP | 0 268 233 A |   | 5/1988 |
| EP | 0607934 |   | 7/1994 |
| GB | 2 022 725 A |   | 12/1979 |
| JP | 63286458 |   | 11/1988 |
| JP | 05269354 A | * | 10/1993 |
| WO | WO 9804853 |   | 2/1998 |

* cited by examiner

*Primary Examiner*—Tae H. Yoon
(74) *Attorney, Agent, or Firm*—Baker & Hostetler LLP

(57) ABSTRACT

The invention pertains to a coating for application to a substrate, whereby the coating comprises at least one the thermoplastic fluorine-containing polymer, and its hardness decreases from the first surface, which is destined for application to the substrate, in the direction of the second surface which is remote from the substrate. The hardness gradient can be achieved by adding filling or reinforcing agents or by addition of at least one thermoplastic polymer. The invention additionally pertains to a gasket that consists of the coating in accordance with the invention or that comprises it.

23 Claims, No Drawings

COATING AND A SEAL CONSISTING OF SAID COATING

FIELD OF THE INVENTION

The invention pertains to a coating that is particularly suitable for use in gaskets and, in particular, cylinder head gaskets.

BACKGROUND OF THE INVENTION

Coatings for gaskets often serve not only for protecting the coated materials from weathering and similar effects, but also for improving the sealing properties of the gasket. This presupposes, in particular, a high capacity of the coating to adapt to the mating surface that is to be sealed off, and in this way, to be able to counteract areas of roughness or unevenness in the mating surface. The coating has to have high deformability for this purpose.

However, there are also cases in which, in addition to a good capacity to adapt to the mating surface, good long-term sliding capability properties on the mating surface are also desired. However, good long-term sliding properties presuppose low flow properties of the coating along with low deformability, i.e., properties that run counter to a good capacity of the coating to adapt to the mating surface.

An example of a gasket which is required to have good long-term sliding properties and a high capacity of adapting to the mating surfaces which are to be sealed off is a cylinder head gasket. Until recently, cylinder head gaskets were usually provided with a thin coating with a thickness of perhaps a few micrometers, whereby this is intended to improve the capacity of the gasket to adapt to the areas of unevenness and roughness of the mating surfaces (engine block and cylinder head) which are to be sealed off.

Such conventional coatings comprise, e.g., nonvulcanized rubber, soft metals or molybdenum disulfide. These coatings certainly improve the capacity of the cylinder head gasket to adapt to the mating surfaces, but they are not satisfactory in terms of long-term sliding properties. Conventional coatings, rather, flow laterally into regions in which they are exposed to particularly high surface pressure so that, after a certain running time, the cylinder head gasket in these regions comes directly into contact with the mating surface that is to be sealed off.

A demand therefore existed for a coating that mutually combines a good capacity to adapt to the mating surface which is to be sealed off, with good long-term sliding properties, on the one hand, and on the other hand maintains these properties even at a high surface pressure and a high temperature.

SUMMARY OF THE INVENTION

The purpose of the invention is to indicate such a coating. This coating should be suitable, in particular, for use in a cylinder head gasket.

This problem is successfully solved via the coating of the present invention. The invention also pertains to a process for manufacturing this as well as a gasket.

DETAILED DESCRIPTION OF THE INVENTION

The combination of long-term sliding properties and a simultaneously high adaptation capacity is achieved in the coating in accordance with claim 1 by way of the fact that it comprises at least one thermoplastic fluorine-containing polymer. Because it is relatively soft, this fluorine-containing polymer ensures a high capacity to adapt to the mating surface that is to be sealed off. The softest region of the coating in accordance with the invention is located on the surface which is remote from the substrate on which the coating is to be applied. The hardness of the coating in accordance with the invention increases in the direction of the substrate that is to be coated. The flow properties and deformability of the coating in accordance with the invention decline as a result of the increasing hardness. Thus the coating in accordance with the invention has a hardness gradient that is designed to be such that the coating is particularly soft in the region of one of its surfaces, whereas its hardness increases in the direction of the other surface. This soft surface permits superb adaptation to a mating surface that is to be sealed off. As a result of the use of a thermoplastic fluorine-containing polymer, this surface has extremely low friction and a high resistance to chemicals as well. Its temperature resistance is also excellent. In contradistinction to conventional coatings, however, the coating in accordance with the invention does not flow completely, even in the case of a high surface pressure and a high temperature, since its hardness increases in the direction of the first surface that is adjacent to the substrate to be coated. Thus, deformability and flow properties are reduced. This increase in hardness expediently takes place continuously. The hardness of a polymer can be determined, for example, by means of the ball pressure hardness method (DIN 53456), or its pressure resistance can be determined in accordance with ASTM D695.

The hardness gradient in the coating can be achieved, on the one hand, by adding at least one filling or reinforcing agent to the thermoplastic fluorine-containing polymer, of which there is at least one, whereby the concentration of the filling or reinforcing agent increases in the direction of the first (substrate) surface. The quantity of filling or reinforcing agents is hereby governed primarily by the requirements that are set for the coating in accordance with the invention. Conventional quantities of filling agent for the soft side of the coating are generally between 0 and 10 vol % and in particular, between 0 and 5 vol %. On the hard (substrate) side, the filling or reinforcing agents are usually used in a proportion of 20–40 vol % or in particular, 30–40 vol %.

Basically, use can be made of all filling or reinforcing agents which are conventionally used for fluorine-containing polymers. Graphite, carbon, carbon fibers, glass fibers, whiskers or molybdenum disulfide are preferred. If fibers or whiskers are used, they are preferably used in such a way that they are aligned essentially parallel to the first and second surface of the coating. This can be achieved in a conventional manner, e.g., by using magnetic fields.

In a second variant of the invention, the coating comprises at least one thermoplastic polycondensate in addition to the fluorine-containing polymer, whereby this polycondensate has a higher hardness than the fluorine-containing polymer. The concentration of the thermoplastic polycondensate increases in the direction of the first (substrate) surface of the coating. Here also, the increase in concentration, and hence the increase in hardness, preferably take place essentially continuously.

The proportion of fluorine-containing polymer expediently amounts to 0 wt % in the region of the first surface, because adhesion to the substrate can be improved in this way. 80–100 wt % and in particular, 95–100 wt % of fluorine-containing polymer is preferably present in the region of the second surface which faces away from the substrate.

At least one filling or reinforcing agent can also be added to the thermoplastic polycondensate. This filling or reinforcing agent expediently serves for adjusting the hardness of the polycondensate in accordance with the requirements in accordance with the invention. Basically, use can be made of all conventional filling or reinforcing agents. Graphite, carbon, carbon fibers, or glass fibers are preferred in particular.

A thermoplastic polycondensate which has an upper long-term usage temperature of at least 150° C. is particularly preferred as the thermoplastic polycondensate. If the coating in accordance with the invention is required to be used for, e.g., a cylinder head gasket, or for similar substrates for which high-temperature stressing can be expected, then use is preferably made of those thermoplastic polycondensates which have an upper long-term usage temperature of at least 180° C. and, in particular, at least 200° C.

For the same reasons, it is expedient if the thermoplastic polycondensate has a dimensional stability under heat (measured in accordance with ASTM D648 at 1.8 N/mm$^2$) of at least 140° C. and in particular, at least 180° C. and preferably, at least 190° C.

High resistance to hydrolysis, even at high temperatures, and good resistance to oil and grease are also required for use in cylinder head gaskets or for similar applications. Thus, use is expediently made of a thermoplastic polycondensate in the coating in accordance with the invention, whereby this thermoplastic polycondensate is resistant to hydrolysis, and it is resistant to hot steam up to, in particular, at least 130° C. The thermoplastic polycondensate should preferably be oil- and grease-resistant up to a temperature of at least 150° C.

Likewise, it is advantageous if the thermoplastic polycondensate that is used possesses good sliding friction characteristics. It preferably possesses a sliding friction coefficient μ of ≦0.7 and preferably, ≦0.55 at 40° C.

Thermoplastic polycondensates which are especially well suited to the coating in accordance with the invention are polysulfone (PSU), polyphenylene sulfide (PPS), polyphenylethersulfone (PPSU), polyethersulfone (PES), polyaryletherketone (PAEK), polyetherketone (PEK) or polyetheretherketone (PEEK). If required, the above-listed properties can be achieved via an appropriate addition of filling or reinforcing agents, or by mixing different thermoplastic polycondensates.

Other thermoplastic polycondensates, such as polyamides, polyimides or polyesters, are less suitable for use in the coating in accordance with the invention because they tend to hydrolyze, especially at an elevated temperature. Because of their superb mechanical and thermal properties and their excellent resistance to oil, grease and hydrolysis even at elevated temperatures, PPS, PEK and PEEK, either filled or non-filled, and mixtures thereof are included among the preferred thermoplastic polycondensates in accordance with the invention.

The fluorine-containing polymer of the coating in accordance with the invention is expediently selected from polytetrafluoroethylene (PTFE), tetrafluoroethylene/hexafluoropropyiene copolymer (FEP) or perfluoroalkoxy copolymer (PFA) which can be used either filled or nonfilled. Mixtures of these fluorine-containing polymers can also be used.

The adhesion of the coating, in accordance with the invention, to the substrate to be coated, is usually adequate, especially when no fluorine-containing polymer is present in the region of the coating's surface which faces the substrate.

However, it is also possible to add at least one adhesion-promoting agent and/or at least one adhesive in the region of the substrate's surface. The selection of these substances is not especially restricted. Attention merely has to be paid to the aspect that they are compatible with the coating and also with the substrate.

The coating in accordance with the invention is expediently manufactured in accordance with the process that is described in claim 18. For this purpose, layers comprising a polymer with decreasing hardness are sequentially applied to a support, and the individual layers are sintered or melted by heating and are thus linked to one another. Various fluorine-containing polymers with a different proportion of filling or reinforcing agent are prepared, for example, in the case of a coating in accordance with claim 3, in which the hardness is varied via the concentration of the filling or reinforcing agents. The polymer with the highest proportion of filling agent is first applied to the support and then sintered. A layer comprising the fluorine-containing polymer with the next highest proportion of filling agent is then coated and again sintered. The process is continued down to the fluorine-containing polymer with the lowest proportion of filling agent, or even no filling agent at all. The sintering process leads not only to linking of the individual layers, but rather to evening out of the filling agent gradient within the coating.

An analogous procedure is followed in the case of a coating in accordance with claim 6. Thus, charges of a thermoplastic polycondensate are prepared, whereby these have different proportions of fluorine-containing polymer. The charge, which contains the lowest proportion of fluorine-containing polymer, is first coated and heated. The uppermost layer is that with the highest proportion of fluorine-containing polymer. The hardness of the individual layers can also be varied by extra additions, such as different proportions of filling or reinforcing agents, or by mixing in an additional thermoplastic polycondensate, etc.

The heating temperature is governed by the components of the coating that are used. A temperature range of 350–400° C. has proven to be suitable in practice for the components that have been indicated as preferred.

The application in layers and heating can take place directly on the substrate to be coated in the form of a support. Alternatively, however, it is possible to manufacture the coating in accordance with the invention independent of the substrate to be coated. Thus, use is made of a suitable support which is not the substrate to be coated. The finished coating is then taken from the support, and then it can optionally be provided with an adhesive layer in order to facilitate subsequent application to the substrate to be coated. In the case where the support on which the coating in accordance with the invention is produced is not the substrate to be coated, it is basically possible to assemble the coating from the soft side to the hard side. However, it is more expedient to start by applying the hardest layer to the support.

The coating in accordance with the invention is expediently used for a gasket, and in particular, a cylinder head gasket. The latter is also a subject of this invention. In one aspect, the coatings in accordance with the invention thereby replace those coatings that have been used previously in known gaskets or cylinder head gaskets.

In an additional aspect, the gasket itself, and particularly the cylinder head gasket, consists entirely of the coating in accordance with the invention. In this case, therefore, no substrate is present to which the coating in accordance with the invention is applied. Rather, the coating in accordance with the invention is produced, during its manufacture, with the shape and thickness distribution which are required for the gasket. This is possible, for example, by introducing the coating into an appropriately constructed sintering mold, and if necessary, varying the layer thickness over the gaskets surface.

The invention will be explained in more detail below by means of an example. The quantities involved are hereby indicated in percentages by weight.

EXAMPLE 1

Manufacture of a coating for a cylinder head gasket

A one-piece metal gasket, which was manufactured in accordance with EP-A-0 835 399, is provided on both sides with a coating in accordance with the invention. The following procedure is hereby followed.

Polymer mixtures of the following composition were prepared:

| Mixture a) | 95% | PEEK |
|---|---|---|
| | 5% | Graphite |
| Mixture b) | 80% | PEEK |
| | 10% | PTFE |
| | 3% | PFA |
| | 7% | Graphite |
| Mixture c) | 70% | PEEK |
| | 15% | PTFE |
| | 8% | PFA |
| | 7% | Graphite |
| Mixture d) | 60% | PEEK |
| | 20% | PTFE |
| | 13% | PFA |
| | 7% | Graphite |
| Mixture e) | 50% | PEEK |
| | 25% | PTFE |
| | 18% | PFA |
| | 7% | Graphite |
| Mixture f) | 40% | PEEK |
| | 30% | PTFE |
| | 23% | PFA |
| | 7% | Graphite |
| Mixture g) | 30% | PEEK |
| | 35% | PTFE |
| | 28% | PFA |
| | 7% | Graphite |
| Mixture h) | 20% | PEEK |
| | 40% | PTFE |
| | 30% | PFA |
| | 10% | Graphite |
| Mixture i) | 10% | PEEK |
| | 50% | PTFE |
| | 30% | PFA |
| | 10% | Graphite |
| Mixture j) | 60% | PTFE |
| | 30% | PFA |
| | 10% | Graphite |

Mixture a), in the form of an aqueous dispersion, was first applied to the thoroughly degreased cylinder head gasket's surfaces to be coated. The layer was first dried in an oven at 100° C. and then sintered at 380° C. After cooling, mixture b), which was also in the form of an aqueous dispersion, was applied to the first layer, and dried and sintered in the same way. Mixtures c)–j) were applied in the same way.

The overall layer thickness was 60 μm. During a long-term test in an engine, the cylinder head gasket which had been provided with the coating in accordance with the invention exhibited superb imperviousness. The coating in accordance with the invention ensured excellent adaptation to the mating surfaces, which were to be sealed off, with simultaneously high stability under loads, and superb long-term sliding properties.

What is claimed is:

1. Coating composition, wherein the coating comprises: thermoplastic fluorine-containing polymer; and
a thermoplastic polycondensate,
wherein the coating has a hardness gradient, wherein the coating hardness generally decreases from a first surface to a second surface, said coating being free from polyamides, polyimides or polyesters,
wherein the coating comprises at least one thermoplastic polycondensate with a higher hardness than the thermoplastic fluorine-containing polymer, of which there is at least one,
wherein the concentration of the thermoplastic polycondensate increases in the direction of the first surface,
wherein, proximal to the first surface, the proportion of fluorine-containing polymer is 0 wt %,
wherein the thermoplastic polycondensate is a material selected from the group consisting of polysulfone (PSU), polyphenylethersulfone (PPSU), polyaryletherketone (PAEK), polyetherketone (PEK), polyetheretherketone (PEEK), and mixtures thereof, and
wherein the coating is essentially free of polymers other than the selected material from said group of thermoplastic polycondensate and the thermoplastic fluorine-containing polymer.

2. Coating in accordance with claim 1, wherein the hardness gradient decreases continuously from the first surface to the second surface.

3. Coating in accordance with claim 1 or 2, wherein at least one filling or reinforcing agent is added to the thermoplastic fluorine-containing polymer, of which there is at least one, wherein the concentration of the filling or reinforcing agent increases in the direction of the first surface.

4. Coating in accordance with claim 3, wherein the filling and reinforcing agent, of which there is at least one, is selected from graphite, carbon, carbon fibers, glass fibers, whiskers or molybdenum disulfide.

5. Coating composition for application to a substrate, wherein the coating comprises:
at least one thermoplastic fluorine-containing polymer; and
a filling or reinforcing agent,
wherein the coating has a hardness gradient, wherein the coating hardness generally decreases from a first surface to a second surface, said coating being free from polyamides, polyimides or polyesters,
wherein at least one filling or reinforcing agent is added to the thermoplastic fluorine-containing polymer, of which there is at least one, wherein the concentration of the filling or reinforcing agent increases in the direction of the first surface,
wherein the agent, of which there is at least one, is a material selected from the group consisting of graphite, carbon, carbon fibers, glass fibers, whiskers, molybdenum disulfide, and combinations thereof, and
wherein the particles comprising the filling or reinforcing agent are aligned essentially parallel to the first and second surface.

6. Coating in accordance with claim 1, wherein the region of the first surface, the proportion of fluorine-containing polymer is 0 wt % and that, in the region of the second surface, it is 80–100 wt %.

7. Coating in accordance with claim 1, wherein at least one filling or reinforcing agent is added to the thermoplastic polycondensate of which there is at least one.

8. Coating in accordance with claim 7, wherein the filling and reinforcing agent, of which there is at least one, is selected from graphite, carbon, carbon fibers, or glass fibers.

9. Coating in accordance with claim 1, wherein the thermoplastic polycondensate has an upper long-term usage temperature of at least 150° C.

10. Coating in accordance with claim 1, wherein the thermoplastic polycondensate has a dimensional stability under heat (ASTM D648; 1.8 N/mm²) of a temperature of at least 140° C.

11. Coating in accordance with claim 1, wherein the thermoplastic polycondensate is resistant to hydrolysis, and is resistant to hot steam up to a temperature of about 130° C.

12. Coating in accordance with claim 1, wherein the thermoplastic polycondensate is resistant to oil and grease up to a temperature of about 150° C.

13. Coating in accordance with claim 1, wherein the thermoplastic polycondensate has a sliding friction coefficient μ of ≦0.7 at a temperature of 40° C.

14. Coating in accordance with claim 1 or 2, wherein the fluorine-containing polymer is a material selected from the group consisting of filled or nonfilled polytetrafluoroethylene (PTFE), perfluoroalkoxy copolymer (PFA), and mixtures thereof.

15. Coating in accordance with claim 1 or 2, wherein at least one adhesion-promoting agent is present in the region of the first surface.

16. Process for the manufacture of a coating composition in accordance with claim 1 or 2, wherein the first layer applied to the support comprises thermoplastic polycondensates but no fluorine-containing polymers, wherein layers comprising a polymer combination of decreasing hardness are sequentially applied to a support, and are sintered or partially melted by heating.

17. Process in accordance with claim 16, wherein the heating is carried out at a temperature of 350–400° C.

18. Process in accordance with claim 16, wherein the support is the substrate that is to be coated.

19. Process in accordance with claim 16, wherein the coating is removed from the support and optionally provided with an adhesive layer.

20. A coating in accordance with claim 1, wherein the coating comprises a gasket.

21. Coating composition, wherein the coating comprises:
at least one thermoplastic fluorine-containing polymer; and
at least one thermoplastic polycondensate,
wherein the thermoplastic polycondensate has a higher hardness than the thermoplastic fluorine-containing polymer, of which there is at least one,
wherein the concentration of the thermoplastic polycondensate increases in the direction of the first surface,
wherein the coating has a hardness gradient, wherein the coating hardness generally decreases from a first surface to a second surface, and
wherein the thermoplastic polycondensate is a material selected from the group consisting of polyaryletherketone (PAEK), polyetherketone (PEK), polyetheretherketone (PEEK), and mixtures thereof.

22. Coating composition, wherein the coating comprises:
at least one thermoplastic fluorine-containing polymer; and
at least one thermoplastic polycondensate;
wherein the thermoplastic polycondensate has a higher hardness than the thermoplastic fluorine-containing polymer, of which there is at least one,
wherein the concentration of the thermoplastic polycondensate increases in the direction of the first surface,
wherein the coating has a hardness gradient, wherein the coating hardness generally decreases from a first surface to a second surface,
wherein the thermoplastic polycondensate is a material selected from the group consisting of polyaryletherketone (PAEK), polyetherketone (PEK), polyetheretherketone (PEEK), and mixtures thereof,
wherein, in the region of the first surface, the proportion of fluorine-containing polymer is 0 wt %, and
wherein, in the region of the second surface, the proportion of fluorine-containing polymer is 80–100 wt %.

23. Process for the manufacture of a coating composition, wherein the coating comprises:
at least one thermoplastic fluorine-containing polymer; and
at least one thermoplastic polycondensate,
wherein the thermoplastic polycondensate has a higher hardness than the thermoplastic fluorine-containing polymer, of which there is at least one,
wherein the concentration of the thermoplastic polycondensate increases in the direction of the first surface,
wherein the coating has a hardness gradient, wherein the coating hardness decreases from a first surface to a second surface,
wherein the thermoplastic polycondensate is a material selected from the group consisting of polyaryletherketone (PAEK), polyetherketone (PEK), polyetheretherketone (PEEK), and mixtures thereof,
wherein, in the region of the first surface, the proportion of fluorine-containing polymer is 0 wt %,
wherein, in the region of the second surface, the proportion of fluorine-containing polymer is 80–100 wt %,
wherein a first layer, comprises thermoplastic polycondensates but no fluorine-containing polymers, and
wherein successive layers comprising a coating of decreasing hardness are sequential, and are sintered or partially melted by heating.

* * * * *